US012308165B2

(12) United States Patent
Winer

(10) Patent No.: US 12,308,165 B2
(45) Date of Patent: May 20, 2025

(54) SOLENOID POSITION ESTIMATION SYSTEMS

(71) Applicant: Hamilton Sundstrand Corporation, Charlotte, NC (US)

(72) Inventor: Gordon Elliott Winer, Prescott, AZ (US)

(73) Assignee: Hamilton Sundstrand Corporation, Charlotte, NC (US)

( * ) Notice: Subject to any disclaimer, the term of this patent is extended or adjusted under 35 U.S.C. 154(b) by 209 days.

(21) Appl. No.: 18/087,651

(22) Filed: Dec. 22, 2022

(65) Prior Publication Data

US 2024/0212906 A1 Jun. 27, 2024

(51) Int. Cl.
*H01F 7/18* (2006.01)

(52) U.S. Cl.
CPC ......... *H01F 7/1844* (2013.01); *H01F 7/1805* (2013.01); *H01F 2007/185* (2013.01)

(58) Field of Classification Search
CPC . H01F 7/1844; H01F 7/1805; H01F 2007/185
USPC .......................................................... 361/160
See application file for complete search history.

(56) References Cited

U.S. PATENT DOCUMENTS

| | | | | |
|---|---|---|---|---|
| 5,583,434 | A | 12/1996 | Moyers et al. | |
| 5,942,892 | A | 8/1999 | Li | |
| 7,511,478 | B2 | 3/2009 | Ganev | |
| 9,989,383 | B2 | 6/2018 | Li et al. | |
| 2012/0019182 | A1* | 1/2012 | Otsuka .................. | H02K 29/03 310/156.01 |
| 2022/0236328 | A1 | 7/2022 | Martens et al. | |

FOREIGN PATENT DOCUMENTS

| | | | | | |
|---|---|---|---|---|---|
| DE | 102008042095 | A1 * | 3/2010 | ........... | G01D 5/2013 |
| DE | 102012005685 | A1 * | 9/2013 | ........... | D06F 39/005 |
| DE | 102019131406 | A1 * | 5/2021 | | |
| DE | 102021201003 | A1 * | 8/2022 | | |

OTHER PUBLICATIONS

Extended European Search Report for European Patent Application No. 23218906.8, dated May 8, 2024, 9 pages.

* cited by examiner

*Primary Examiner* — Thienvu V Tran
*Assistant Examiner* — Sreeya Sreevatsa
(74) *Attorney, Agent, or Firm* — Kinney & Lange, P.A.

(57) ABSTRACT

A system can include an inductance module configured to operatively connect to a solenoid. The inductance module can be configured to input an AC excitation signal to the solenoid, determine and/or compare a current-voltage (CV) phase shift between a solenoid current and solenoid voltage, and output an output signal indicative of solenoid inductance based on the CV phase shift.

14 Claims, 14 Drawing Sheets

SOLENOID POSITION ESTIMATION SYSTEMS

FIELD

This disclosure relates to solenoid position estimation systems.

BACKGROUND

Traditional solenoid systems require a separate sensor to determine a solenoid position. Knowing a position of the solenoid can be useful for one or more reasons in several applications.

Such conventional methods and systems have generally been considered satisfactory for their intended purpose. However, there is still a need in the art for improvements. The present disclosure provides a solution for this need.

SUMMARY

A system can include an inductance module configured to operatively connect to a solenoid. The inductance module can be configured to input an AC excitation signal to the solenoid, determine and/or compare a current-voltage (CV) phase shift between a solenoid current and solenoid voltage, and output an output signal indicative of solenoid inductance based on the CV phase shift.

The inductance module can be configured to output a DC signal correlated to the CV phase shift which correlates to solenoid inductance. In certain embodiments, the system can include a solenoid position module operatively connected to the inductance module. The position module can be configured to receive the output signal and output a solenoid position signal as a function of the output signal such that a solenoid position is correlated to solenoid inductance, which is correlated to the CV phase shift.

In certain embodiments, the inductance module can include an AC excitation module configured to connect to the solenoid to output the AC excitation signal to the solenoid. The inductance module can include a reference module connected to the AC excitation module and configured to read a voltage drop across a reference resistor. The reference resistor can be disposed in series between the AC excitation module and the solenoid. The reference module can be configured to output a reference signal indicative of voltage across the reference resistor and/or current through the reference resistor.

The inductance module can include a 90-degree phase shift module connected to the reference module to receive the reference signal and to output a phase shift signal being the reference signal phase shifted 90 degrees. The inductance module can include a zero-cross comparator connected to the 90-degree phase shift module and configured to receive the phase shift signal and output a clock signal. In certain embodiments, the clock signal can be a square wave signal. The clock signal can be 90 degrees phase shifted from the solenoid current.

The inductance module can include a DC removal module configured to connect to the solenoid to receive solenoid voltage and/or solenoid current, and to remove a DC component thereof to output an AC component. The inductance module can include a synchronous demodulator module operatively connected to the DC removal module to receive the AC component. The synchronous demodulator module can be operatively connected to the zero-cross comparator module to receive the clock signal at a quadrature clock thereof to output a quadrature clock signal, to sum the AC component and the quadrature clock signal at a quadrature comparator, and to output a demodulator signal having a modified wave shape with an average amplitude indicative of inductance of the solenoid. The quadrature clock can allow the synchronous demodulator to be sensitive to the imaginary portion of the solenoid voltage which is indicative of the solenoid inductance, and the solenoid inductance is indicative of solenoid position.

The inductance module can include a low pass filter operatively connected to the synchronous demodulator module to receive the demodulator signal, and to output a filter DC signal that is the average value of the demodulator output. The filter DC signal can be the output signal indicative of solenoid inductance.

In certain embodiments, the clock signal can be keyed to and phase shifted 90 degrees from solenoid current, and the AC component input to the synchronous demodulator module can be AC solenoid voltage such that the demodulator provides a comparison of phase shifted solenoid current to solenoid voltage. The reverse (e.g., where the clock signal is keyed to and phase shifted 90-degrees from solenoid voltage, and the AC component input is solenoid current) is contemplated herein.

In certain embodiments, the system can include the solenoid. In certain embodiments, the system can include a feedback system connected to and/or including the inductance module and configured to control a position of the solenoid based on the output signal.

In certain embodiments, the inductance module (including any suitable component(s) thereof) can include analog hardware, software, and/or any suitable combination thereof. Any suitable module disclosed herein can include any suitable hardware and/or software module(s) configured to perform the associated function and/or any other suitable function.

In accordance with at least one aspect of this disclosure, an inductance module operatively connected to the solenoid and configured to input one or more AC excitation signals to the solenoid, to compare a phase shift between a solenoid current and solenoid voltage, and to output an output signal indicative of solenoid inductance.

In accordance with at least one aspect of this disclosure, a method can include injecting an AC excitation signal into a solenoid, and comparing phase shifted AC solenoid current or AC solenoid voltage to non-phase shifted AC solenoid voltage or AC solenoid current, respectively, to output a signal indicative of solenoid inductance. The method can include creating a reference signal indicative of solenoid current, and phase shifting the reference signal 90 degrees. The method can include determining solenoid position as a function of solenoid inductance.

These and other features of the embodiments of the subject disclosure will become more readily apparent to those skilled in the art from the following detailed description taken in conjunction with the drawings.

BRIEF DESCRIPTION OF THE DRAWINGS

So that those skilled in the art to which the subject disclosure appertains will readily understand how to make and use the devices and methods of the subject disclosure without undue experimentation, embodiments thereof will be described in detail herein below with reference to certain figures, wherein.

DETAILED DESCRIPTION

Figure 1:
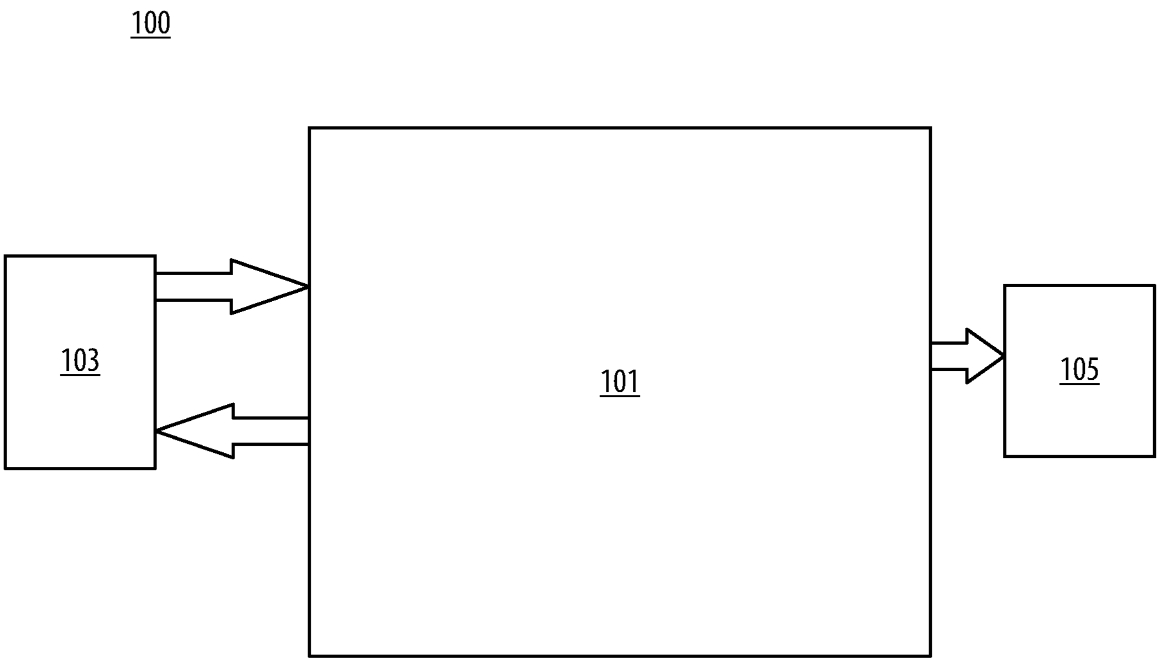
FIG. 1 is a schematic diagram of an embodiment of a system in accordance with this disclosure.

Reference will now be made to the drawings wherein like reference numerals identify similar structural features or aspects of the subject disclosure. For purposes of explanation and illustration, and not limitation, an illustrative view of an embodiment of a system in accordance with the disclosure is shown in FIG. 1 and is designated generally by reference character 100. Other embodiments and/or aspects of this disclosure are shown in FIGS. 2-5E. Certain embodiments described herein can be used to determine solenoid valve position without an independent position sensor, for example.

Referring to FIG. 1, a system 100 can include an inductance module 101 configured to operatively connect to a solenoid 103. The inductance module 101 can be configured to input an AC excitation signal to the solenoid 103, determine and/or compare a current-voltage (CV) phase shift between a solenoid current and solenoid voltage, and output an output signal indicative of solenoid inductance based on the CV phase shift.

In certain embodiments, the inductance module 101 can be configured to output a DC signal correlated to the CV phase shift which correlates to solenoid inductance. In certain embodiments, the system 100 can include a solenoid position module 105 operatively connected to the inductance module 101. The position module 105 can be configured to receive the output signal and output a solenoid position signal as a function of the output signal such that a solenoid position (e.g., a valve position) is correlated to solenoid inductance, which is correlated to the CV phase shift.

Figure 2:
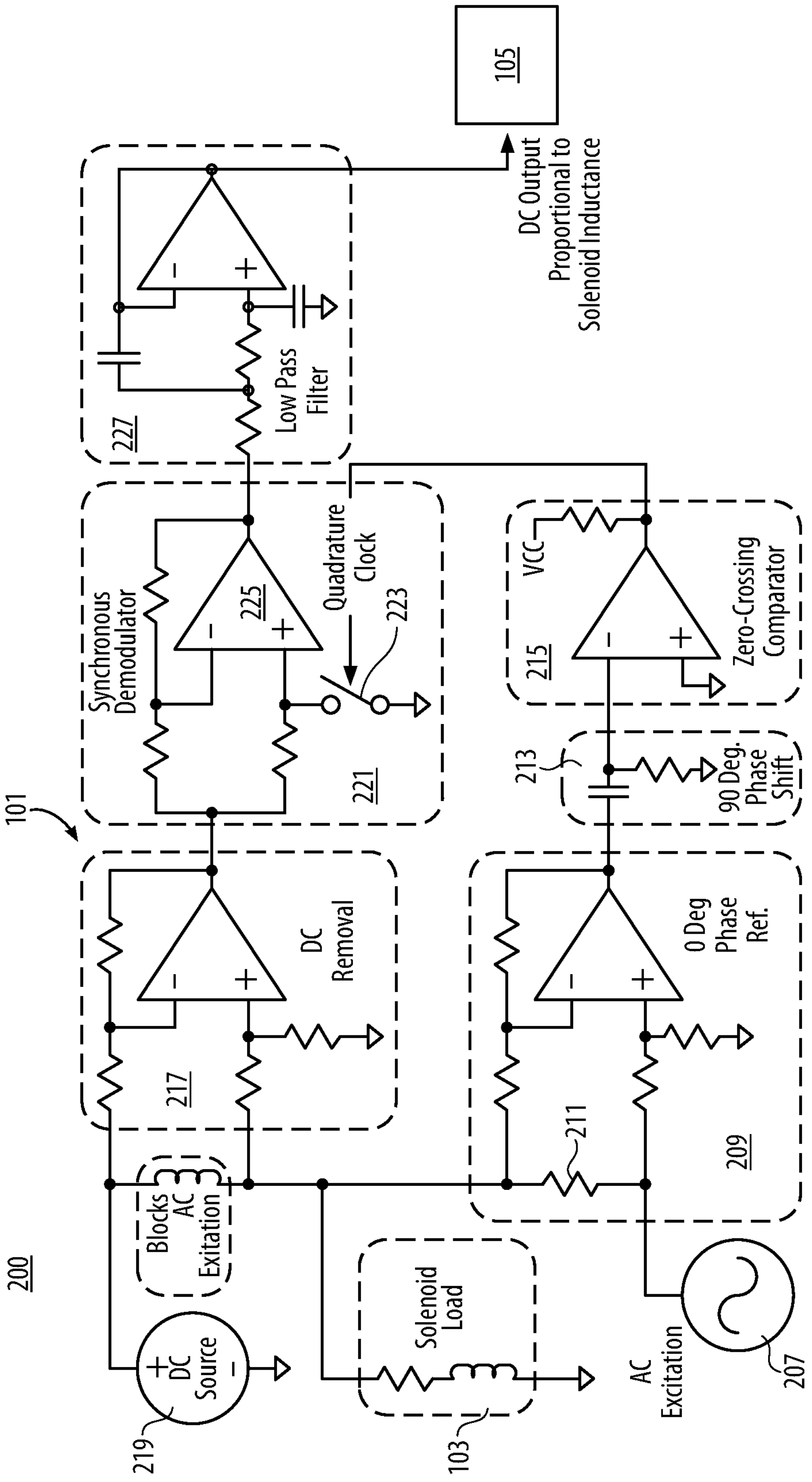
FIG. 2 is an embodiment of a circuit diagram of an embodiment of a system in accordance with this disclosure.
Figure 3:
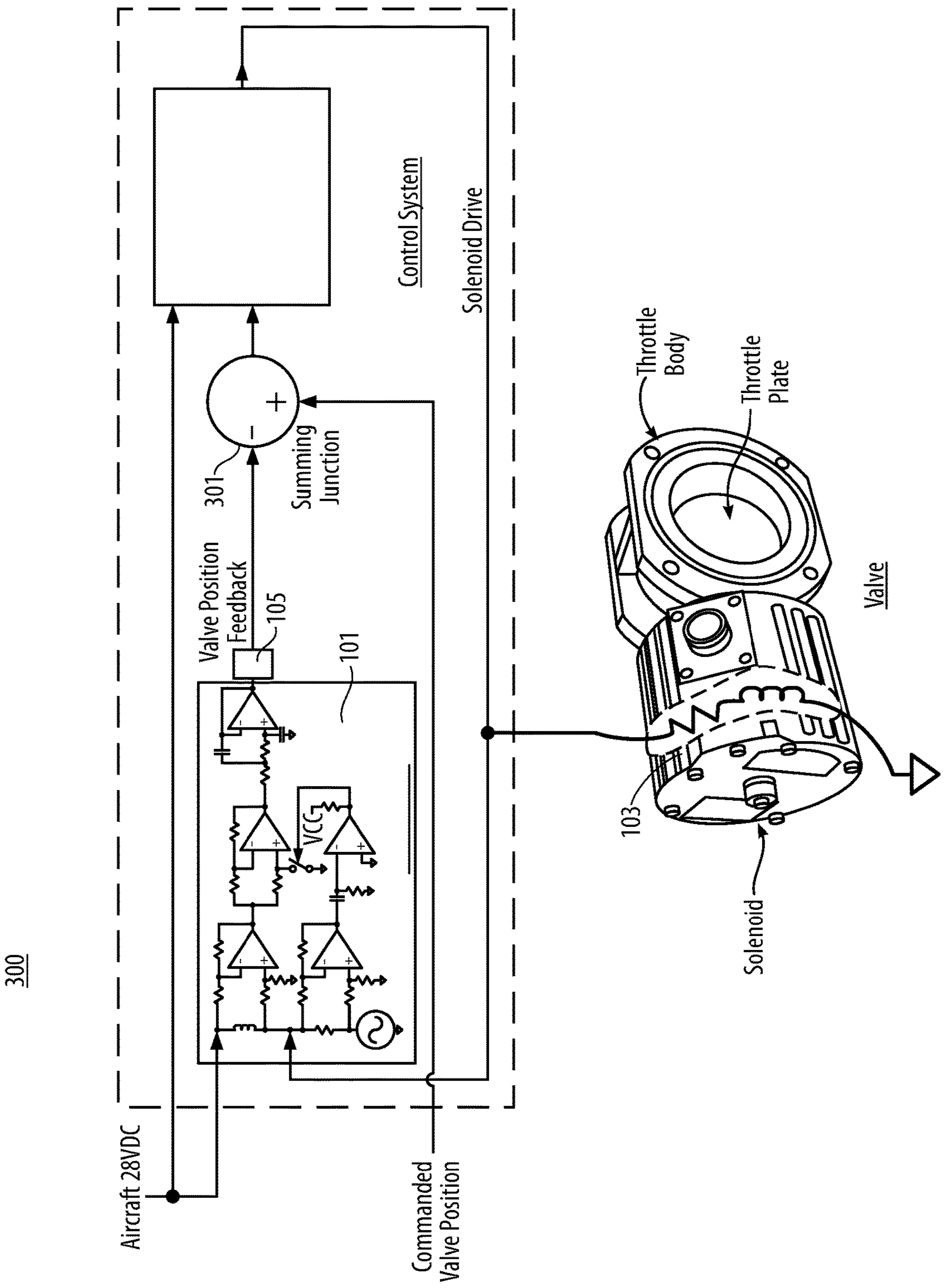
FIG. 3 is a schematic diagram showing the system of FIG. 1 having a feedback system for controlling a solenoid valve.

In certain embodiments, referring additionally to FIG. 2, in an embodiment of a system 200, the inductance module 101 can include an AC excitation module 207 configured to connect to the solenoid 103 to output the AC excitation signal to the solenoid 103. The AC excitation module 207 can be any suitable AC voltage source of any suitable voltage, and have any suitable frequency (e.g., 10 kHz).

The inductance module 101 can include a reference module 209 connected to the AC excitation module 207 and configured to read a voltage drop across a reference resistor 211. The reference resistor 211 can be disposed in series between the AC excitation module 207 and the solenoid 103, e.g., as shown. The reference module 209 can be configured to output a reference signal indicative of voltage across the reference resistor 211 and/or current through the reference resistor 211 (e.g., which is shown as R2 in FIG. 4A and FIG. 5A). For example, the reference module 209 can be an in-phase current amplifier circuit that is configured to output a voltage that represents a current through the reference resistor 211. The reference module 209 can include circuit components and/or a digital equivalent as shown in FIG. 2, for example.

The inductance module 101 can include a 90-degree phase shift module 213 connected to the reference module 209 to receive the reference signal and to output a phase shift signal being the reference signal phase shifted 90 degrees. The 90-degree phase shift module 209 can include circuit components and/or a digital equivalent as shown in FIG. 2, for example.

The inductance module 101 can include a zero-cross comparator 215 connected to the 90-degree phase shift module 213 and configured to receive the phase shift signal and output a clock signal. In certain embodiments, the clock signal can be a square wave signal (e.g., a square wave voltage). The clock signal can be 90 degrees phase shifted from the solenoid current. The zero-cross comparator module 209 can include circuit components and/or a digital equivalent as shown in FIG. 2, for example.

The inductance module 101 can include a DC removal module 217 configured to connect to the solenoid 103 to receive solenoid voltage and/or solenoid current, and to remove a DC component thereof to output an AC component. For example, a DC source 219 can be configured to power the solenoid 103 to move the solenoid 103 (e.g., to move a throttle butterfly valve position) such that the total voltage seen by the DC removal module 217 includes both a DC solenoid voltage and the AC solenoid voltage. The DC removal module 217 can include circuit components and/or a digital equivalent as shown in FIG. 2, for example. In certain embodiments, the DC removal module 217 can be emitted.

The inductance module 101 can include a synchronous demodulator module 221 operatively connected to the DC removal module 217 to receive the AC component. The synchronous demodulator module 221 can be operatively connected to the zero-cross comparator 215 module to receive the clock signal at a quadrature clock 223 thereof to output a quadrature clock signal, to detect the imaginary portion of the AC signal (e.g., using a quadrature comparator, e.g., by comparing the AC component and the quadrature clock signal at a quadrature comparator 225), and to output a demodulator signal having a modified wave shape with an average amplitude indicative of inductance of the solenoid 103. The synchronous demodulator module 221 can include circuit components and/or a digital equivalent as shown in FIG. 2, for example.

The inductance module 101 can include a low pass filter 227 operatively connected to the synchronous demodulator module 221 to receive the demodulator signal, and to output a filter DC signal that is the average value of the demodulator output. The filter DC signal can be the output signal indicative of solenoid inductance. For example, the filter DC signal can be correlated by its magnitude to a solenoid inductance and/or position. The low pass filter 227 can include circuit components and/or a digital equivalent as shown in FIG. 2, for example.

In certain embodiments, e.g., as shown in the embodiment of FIG. 2, the clock signal can be keyed to and phase shifted 90 degrees from solenoid current, and the AC component input to the synchronous demodulator module 221 can be AC solenoid voltage such that the demodulator module 221 provides a comparison of phase shifted solenoid current to solenoid voltage. The reverse (e.g., where the clock signal is keyed to and phase shifted 90-degrees from solenoid voltage, and the AC component input is solenoid current) is contemplated herein.

In certain embodiments, the system 100, 200 can include the solenoid 103. In certain embodiments, referring additionally to FIG. 3, the system 300 can include a feedback system connected to and/or including the inductance module 101 and configured to control a position of the solenoid 103 based on the output signal. For example, the system 300 can include the position module 105 which can output a position signal, which can be summed at the summing junction 301 with the commanded position. In this regard, the comparison can allow feedback control of the solenoid 103 as a function of its estimated position determined through inductance of the solenoid 103. Such a system can be implemented in an aircraft system, e.g., a throttle system, for example.

In certain embodiments, the inductance module 101 (including any suitable component(s)/module(s) thereof) can include analog hardware, software, and/or any suitable combination thereof. Any suitable module disclosed herein can include any suitable computer hardware and/or software module(s) configured to perform the associated function and/or any other suitable function.

In accordance with at least one aspect of this disclosure, an inductance module 101 can be operatively connected to the solenoid 103 and configured to input one or more AC excitation signals to the solenoid 103, to compare a phase shift between a solenoid current and solenoid voltage, and to output an output signal indicative of solenoid inductance. Any other suitable functions are contemplated herein.

In accordance with at least one aspect of this disclosure, a method can include injecting an AC excitation signal into a solenoid, and comparing phase shifted AC solenoid current or AC solenoid voltage to non-phase shifted AC solenoid voltage or AC solenoid current, respectively, to output a signal indicative of solenoid inductance. The method can include creating a reference signal indicative of solenoid current, and phase shifting the reference signal 90 degrees. The method can include determining solenoid position as a function of solenoid inductance.

Embodiments can inject AC voltage to a solenoid, which allows comparison of the AC current of the solenoid the AC voltage of the solenoid, which are naturally off phase. The amount of phase shift between solenoid voltage and current is related to inductance. In certain embodiments, a 90 degree phase shift can be added to the clock of the demodulator module so the ultimate output is useful and not meaningfully affected by external factors.

Embodiments can include a reference module with no phase shift that is an amplifier used for keying the clock signal to current (e.g., voltage drop across resistor). The amplifier can be a differential amplifier that reflects current drop across the reference resistor. The output of the reference module can be a voltage representative of solenoid current. This can then be shifted 90 degrees by a phase shift module. This resulting signal can then be turned into a square wave signal using a zero cross comparator to have verticals at zero crossings of the current keyed and shifted AC signal. The clock signal output can be a square wave that is 90-degrees phase shifted from the excitation current (which can be voltage instead as long as current is used later for comparison), which is then fed to the quadrature clock. Thus, this clock signal can always be fixed to the phase of the current and can always be 90-degrees phase shifted.

Embodiments can include a synchronous demodulator (also known as a phase sensitive demodulator and quadrature demodulator) having a quadrature clock that changes the output of comparator to positive (e.g., when open) or negative (e.g., when closed). Thus the demodulator can change the polarity of the input signal. In this regard, and due to the phase shift of the clock signal, the demodulator can be sensitive only to the imaginary component which removes issues relating to temperature and other external factors. This module can produce an output voltage having an average value that varies with the amount phase shift between the demodulator clock and the input (which is a function of the phase shift of the solenoid current and voltage). The demodulator and its associated low pass filter can produce a DC voltage that is thus related to solenoid inductance. The solenoid inductance can be correlated to the mechanical position of the solenoid. For example, the phase shift between the clock signal and the analog input will influence the area-under-the curve for the positive and negative portions of the demodulator AC output. The low-pass filter after the demodulator can produce the average value of the algebraic summation of the positive and negative portions of the demodulator output.

Figure 4A:
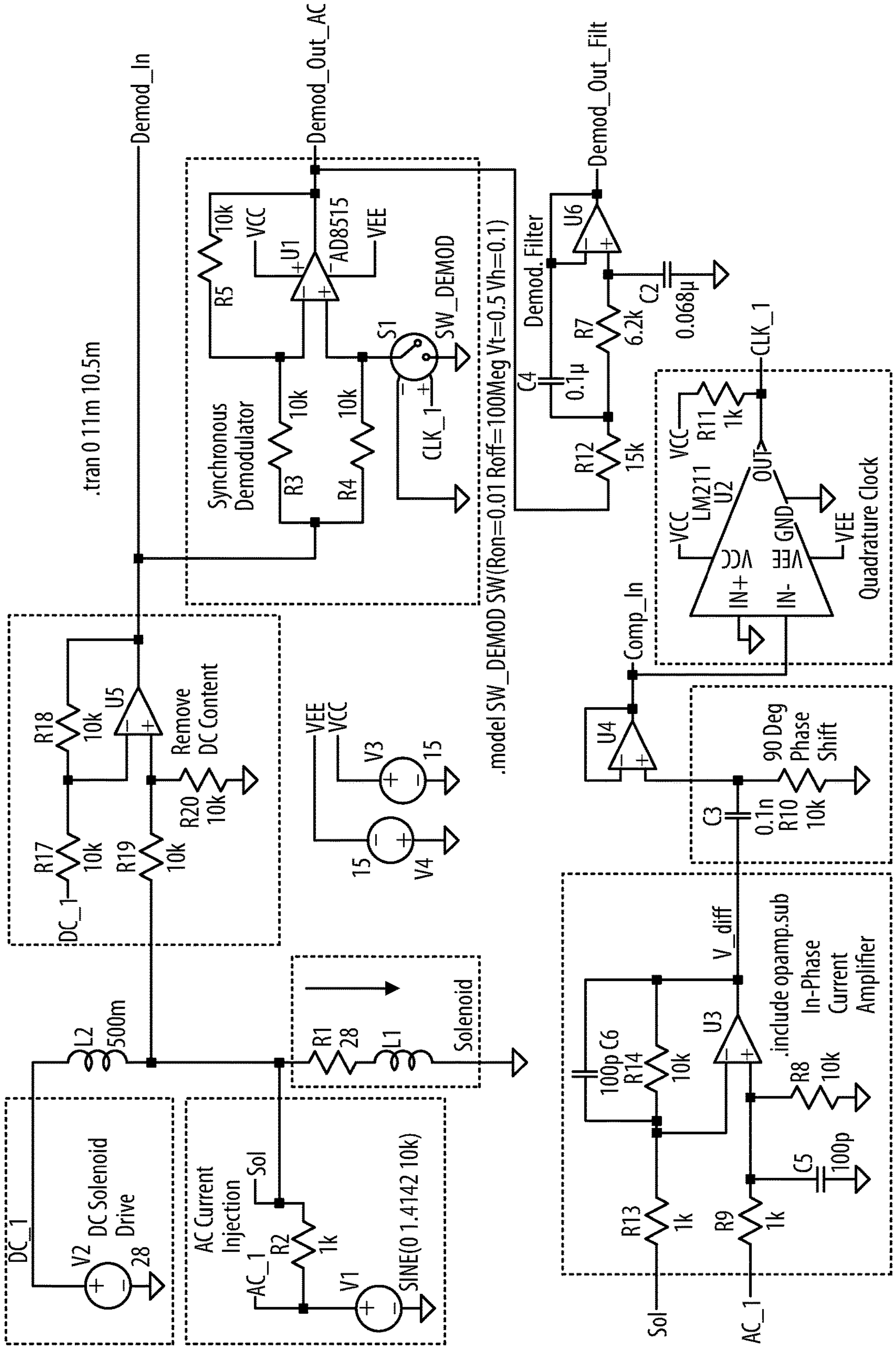
FIG. 4A is circuit diagram of an embodiment of a simulation circuit.
Figure 4B:
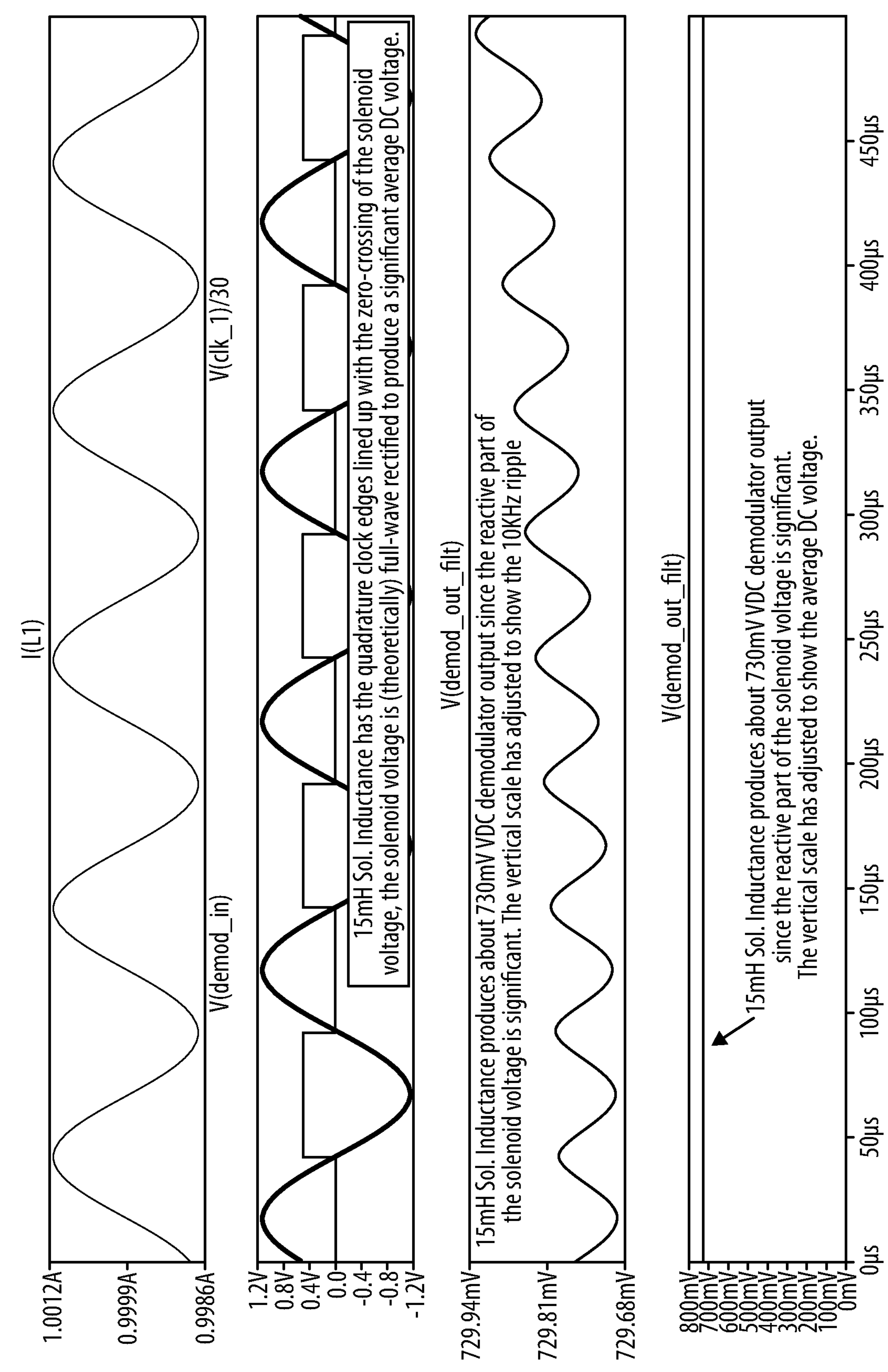
FIG. 4B shows plotted results of the simulation circuit of FIG. 4A at 15 mH solenoid inductance.
Figure 5A:
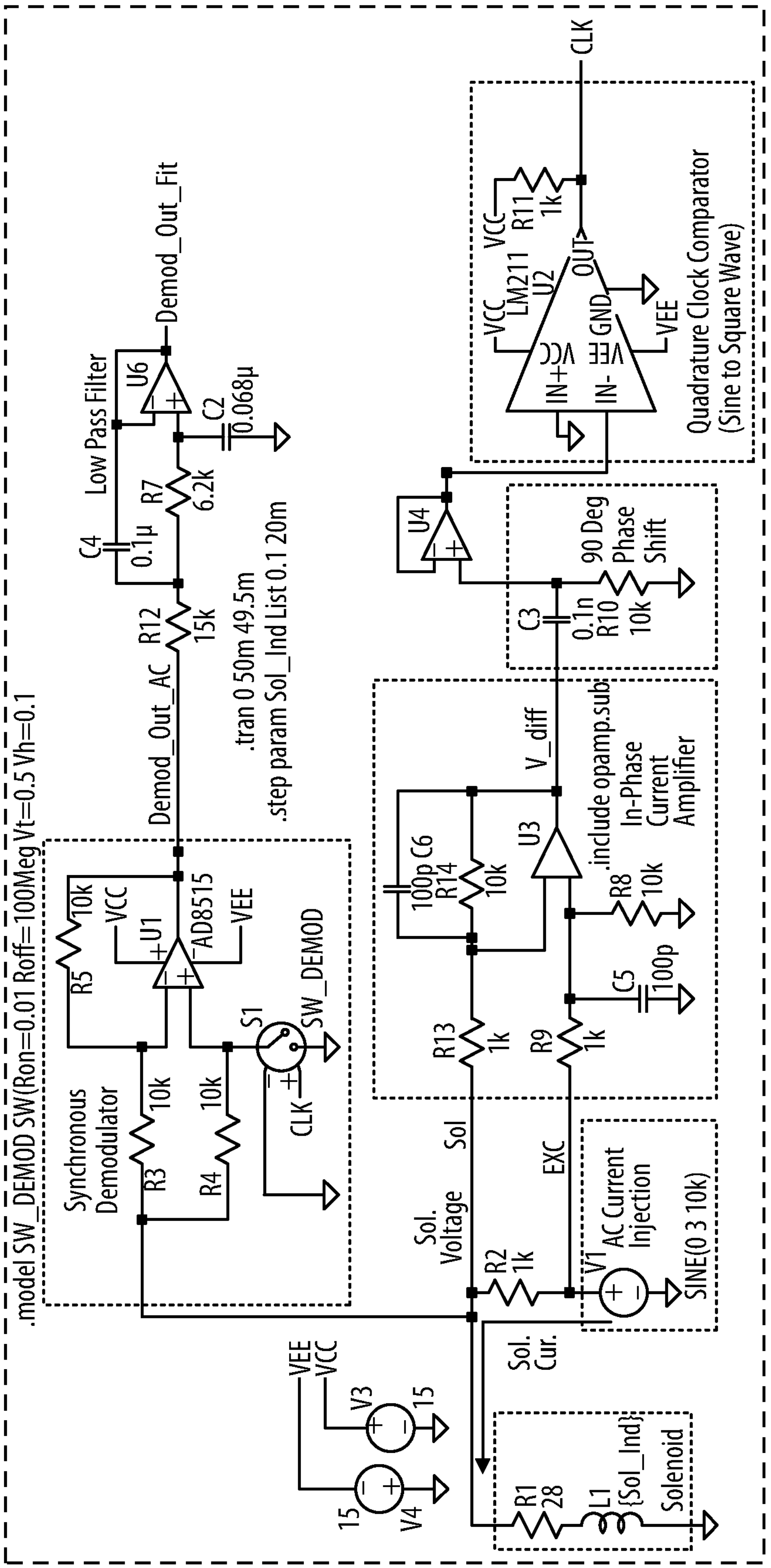
FIG. 5A shows another circuit diagram of an embodiment of a simulation circuit.
Figure 5B:
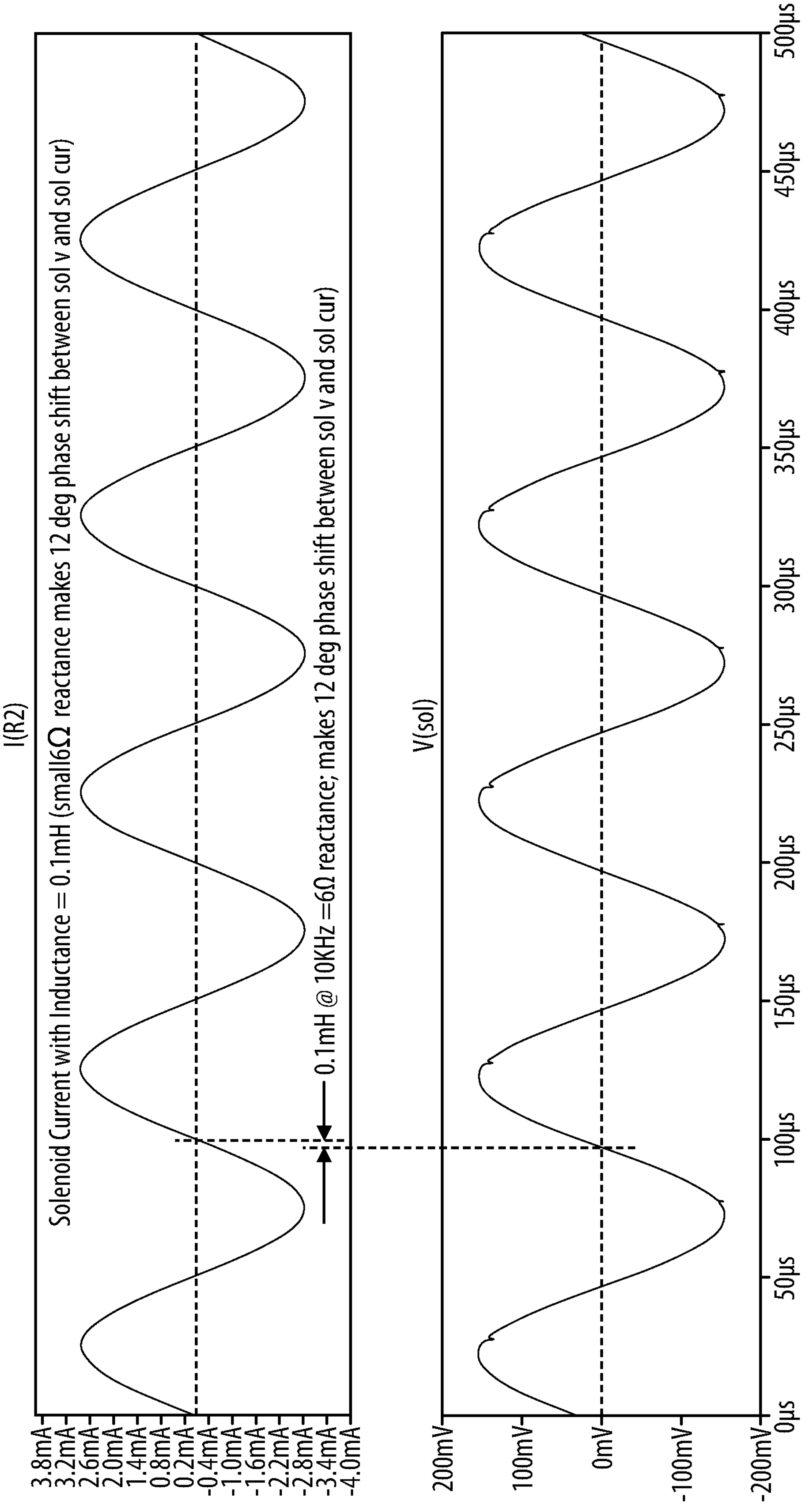
FIG. 5B shows a comparison of solenoid current and solenoid voltage at a 0.1 mH solenoid inductance, showing a 12 degree phase shift.
Figure 5C:
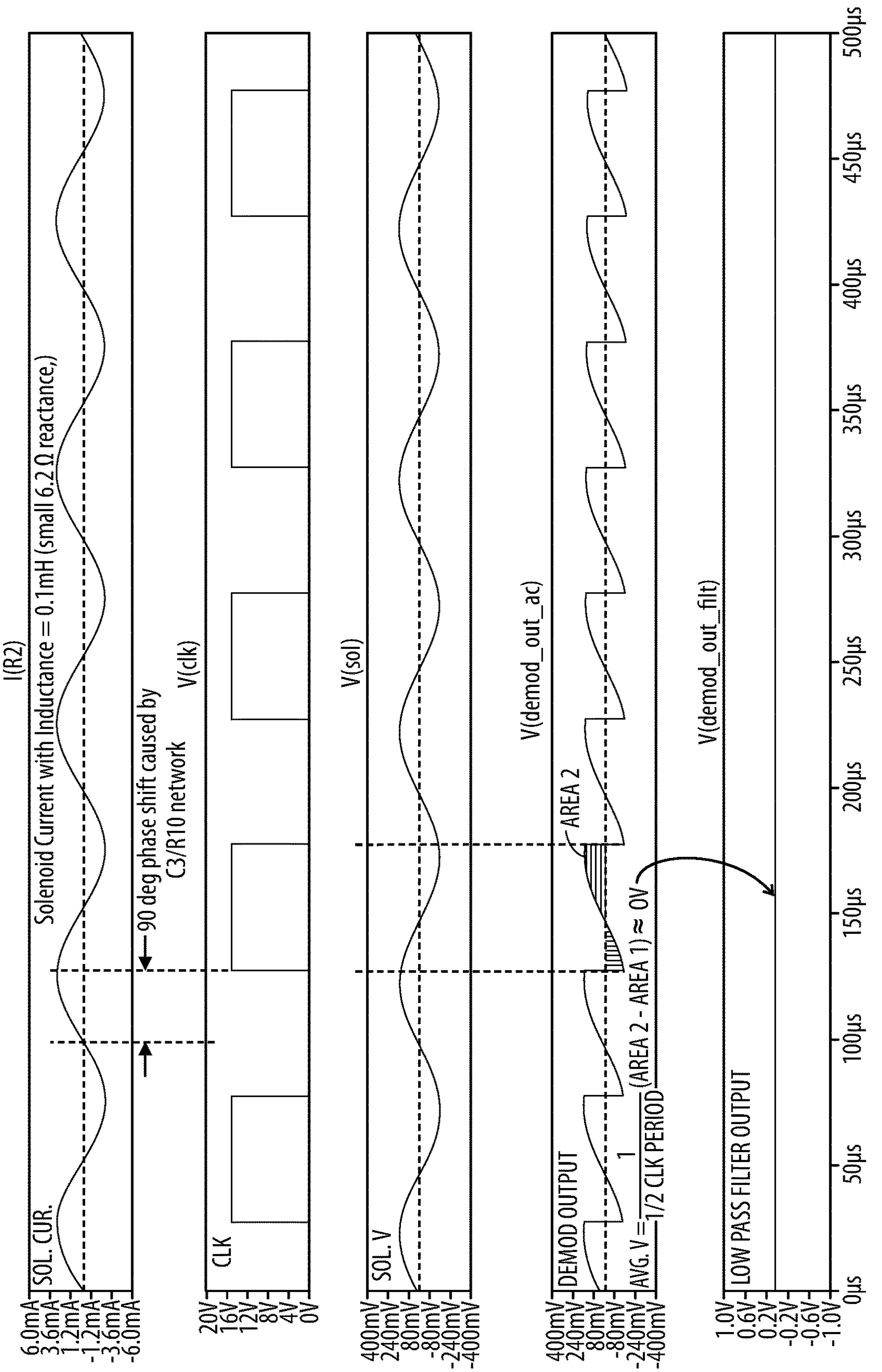
FIG. 5C shows plotted results of the simulation circuit of FIG. 5B.
Figure 5D:
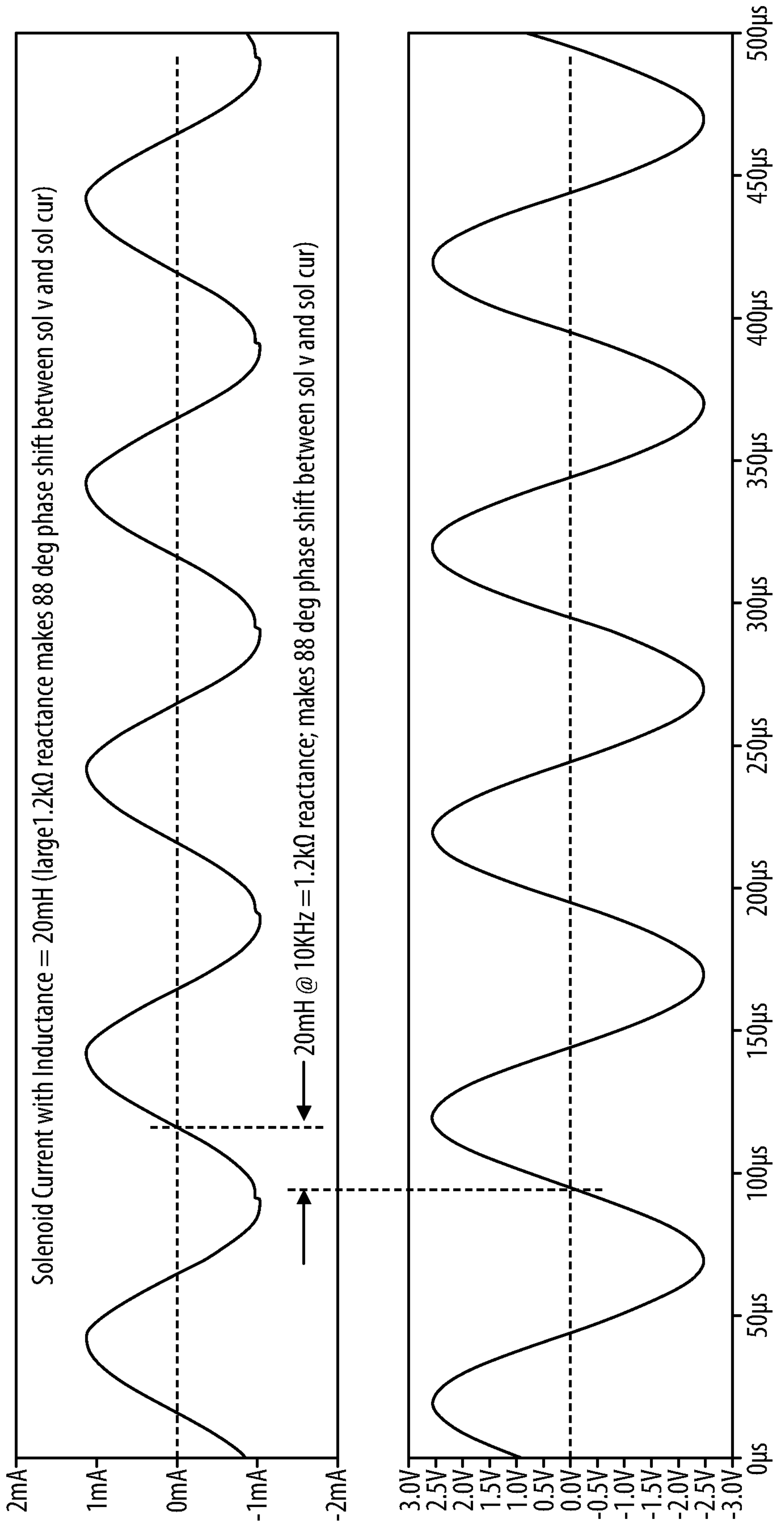
FIG. 5D shows a comparison of solenoid current and solenoid voltage at a 20 mH solenoid inductance, showing an 88 degree phase shift.
Figure 5E:
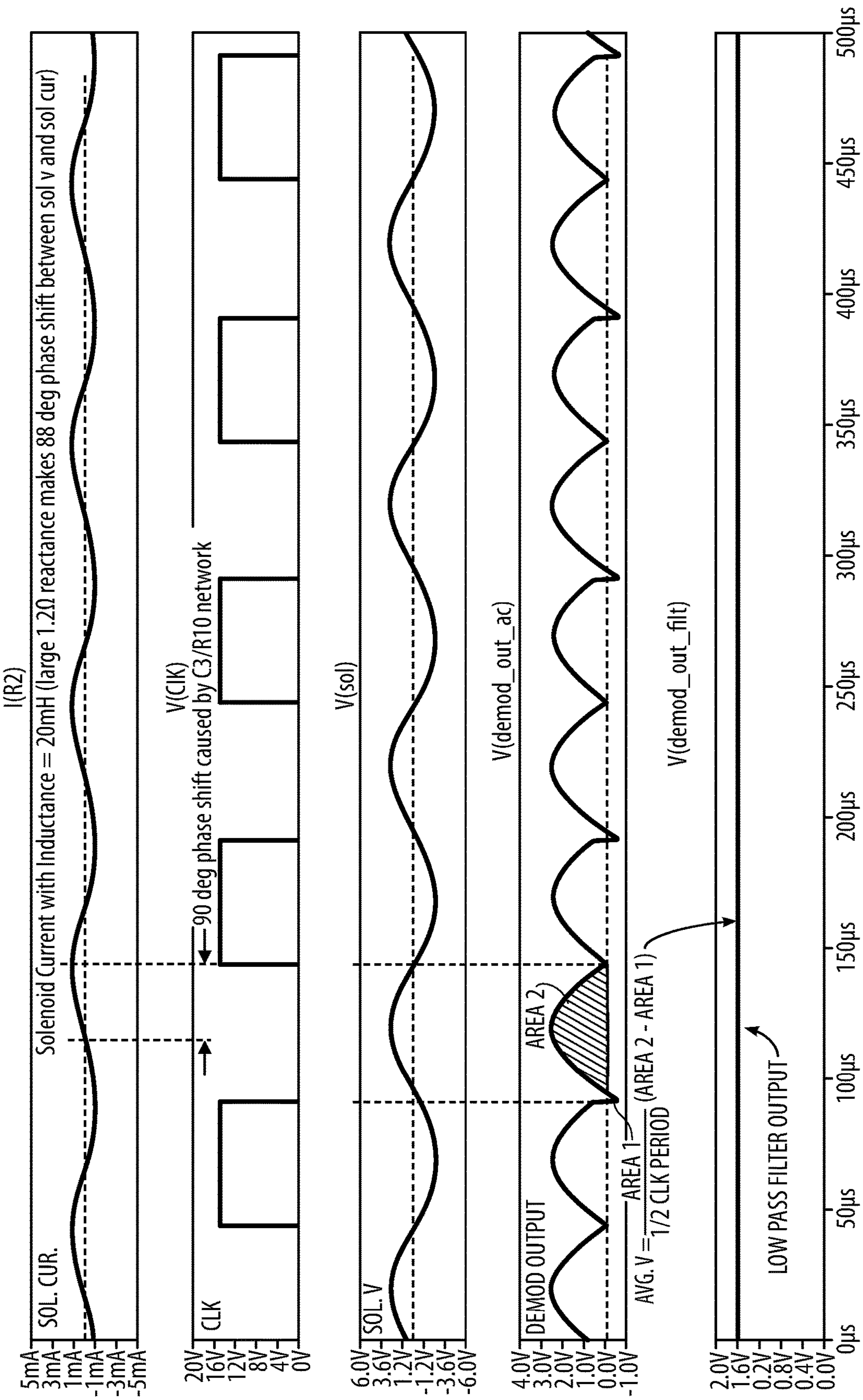
FIG. 5E shows plotted results of the simulation circuit of FIG. 5D.

Embodiments can include applying a demodulator to measure solenoid inductance. The demodulator clock can be a 90 degree phase shifted version of solenoid current, (current passing through R2), as illustrated in FIGS. 4A and 5A. The 90 degree phase shift makes the demodulator sensitive to the imaginary portion of solenoid voltage; more inductance will produce a larger phase shift between solenoid current and solenoid voltage, thus producing a larger imaginary portion. The solenoid voltage can be fed to the demodulator input, and the phase shift between the input solenoid voltage and the clock (where the clock is based on solenoid current), determines the average value of the demodulator output.

Figure 4C:
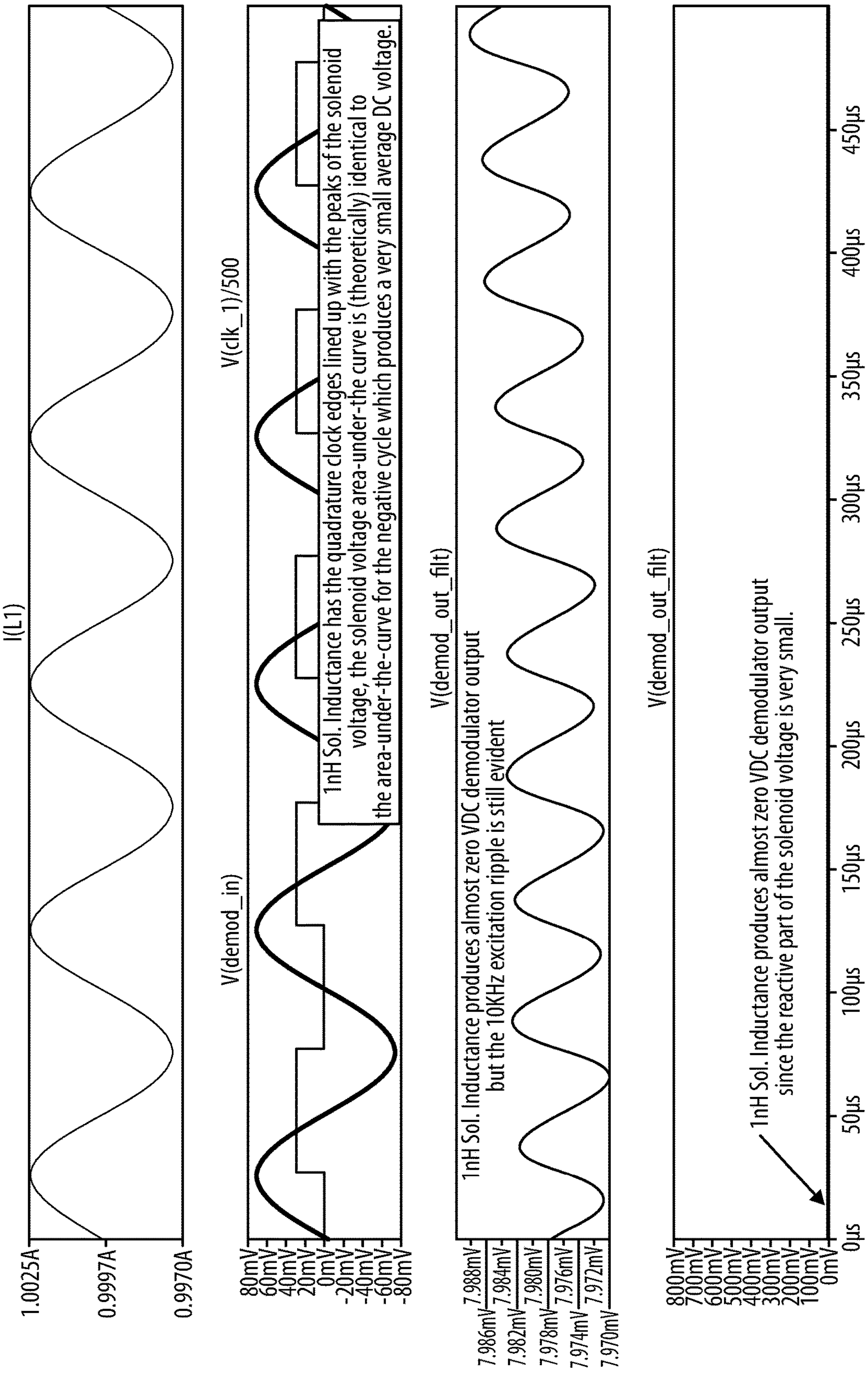
FIG. 4C shows plotted results of the simulation circuit of FIG. 4A at 1 nH solenoid inductance.
Figure 4D:
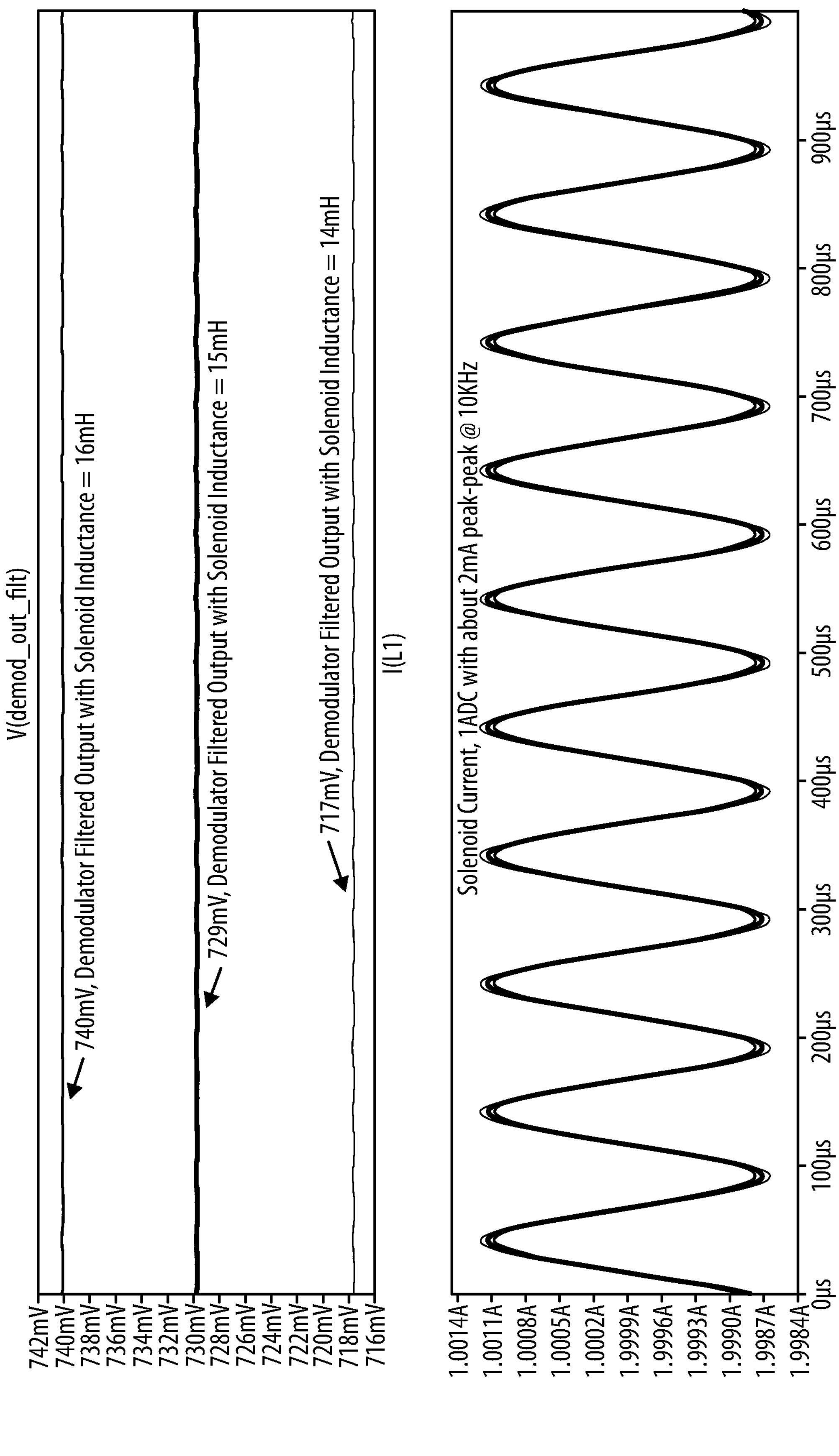
FIG. 4D shows plotted results of the simulation circuit of FIG. 4A at varying solenoid inductance, showing significant output difference with changing inductance.

Referring now to FIGS. 4A-4F, a simulated circuit and results are shown. In a first simulation shown in FIG. 4B, solenoid inductance L1 is set to 15 mH which produces a significant imaginary voltage at 10 KHz excitation, which produces a significant average DC voltage from the demodulator output (V(demod_out_filt)) as shown in waveforms. For comparison, FIG. 4C shows the small DC output voltage when the solenoid inductance is very small. As shown, I(L1) is the total current signal on the solenoid which is both DC plus AC ripple (e.g., the AC portion of signal is very small as shown by the vertical axis of the chart). V(clk_1) shows the clock signal keyed to the current I(L1). The input voltage to the demodulator (e.g., the AC component) is shown as V(demod_in).

Figure 4E:
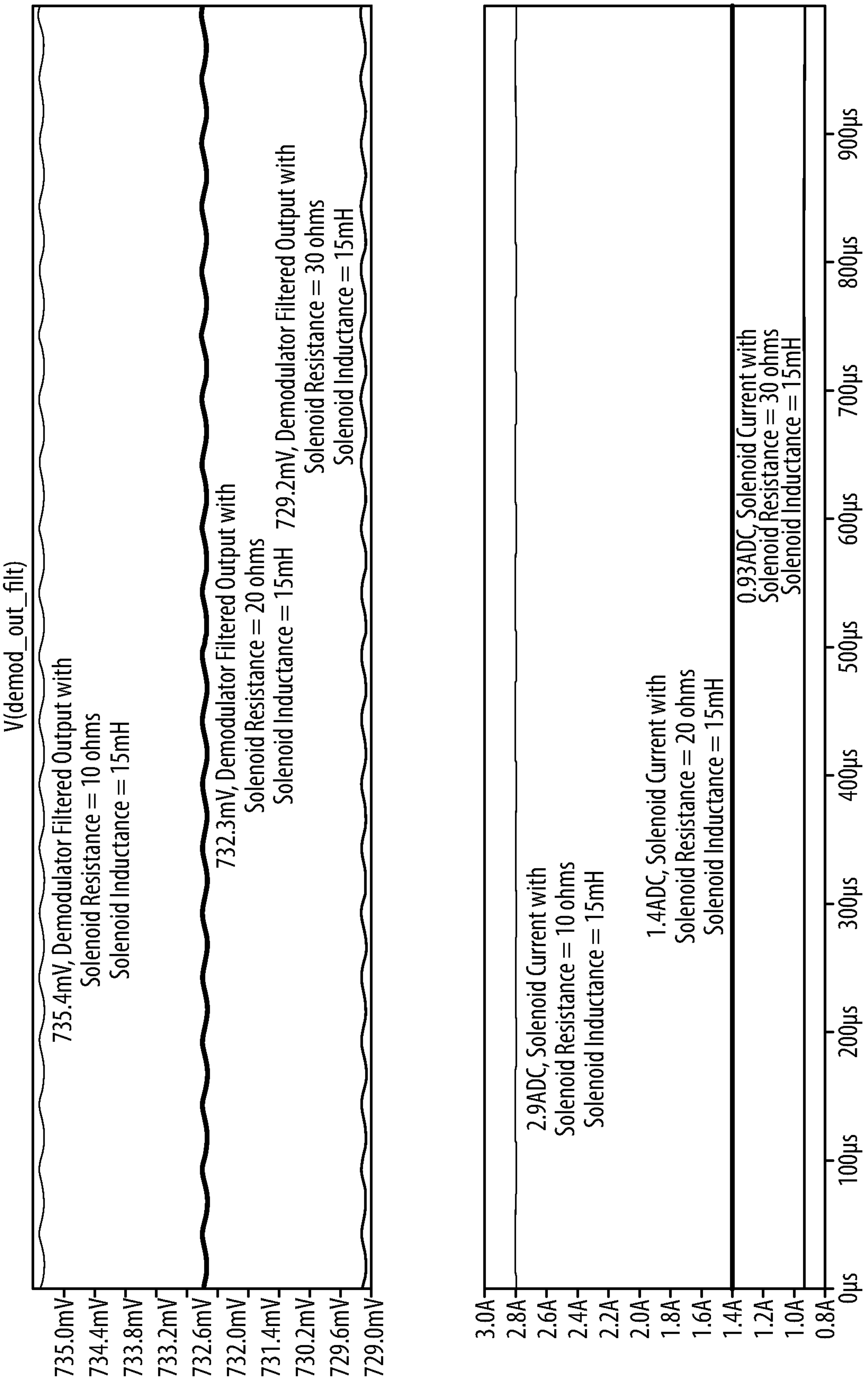
FIG. 4E shows plotted results of the simulation circuit of FIG. 4A at 15 mH solenoid inductance, and varying solenoid resistance, showing insignificant output difference with changing resistance.

In a second simulation as shown in FIG. 4C, the solenoid inductance L1 is set to a very small 1 nano-Henry and shows the demodulator DC output voltage is almost zero due to the almost zero imaginary art of the solenoid voltage. In a third simulation, shown in FIG. 4D, the demodulator filtered output voltage at three different solenoid inductances, 14 mH, 15 mH and 16 mH, is shown. The output voltages at 14 mH=717 mVDC, 15 mH=729 mVDC, and 16 mH=740 mVDC. Solenoid current is at about 1 ADC with about 2 mA peak to peak 10 KHz content. In FIG. 4E, the solenoid DC resistance is changed to demonstrate the effects due to temperature. As can be seen, the effects of resistance change, and thus temperature change, are negligible so resistance changes do not materially influence DC output voltage because the resistance does not impact the amplitude of the imaginary voltage. Embodiments show small sensitivity to large resistance changes. Solenoid current is proportional to resistance. There is a +/−0.42% change of DC output voltage (732.3 mV+/−3.1 mV) due to a +/−50% change of solenoid DC resistance (20 ohms+/−10 ohms). It is noted that the small peak-peak 10 KHz excitation current is not visible in the charts due to the current scale.

Figure 4F:
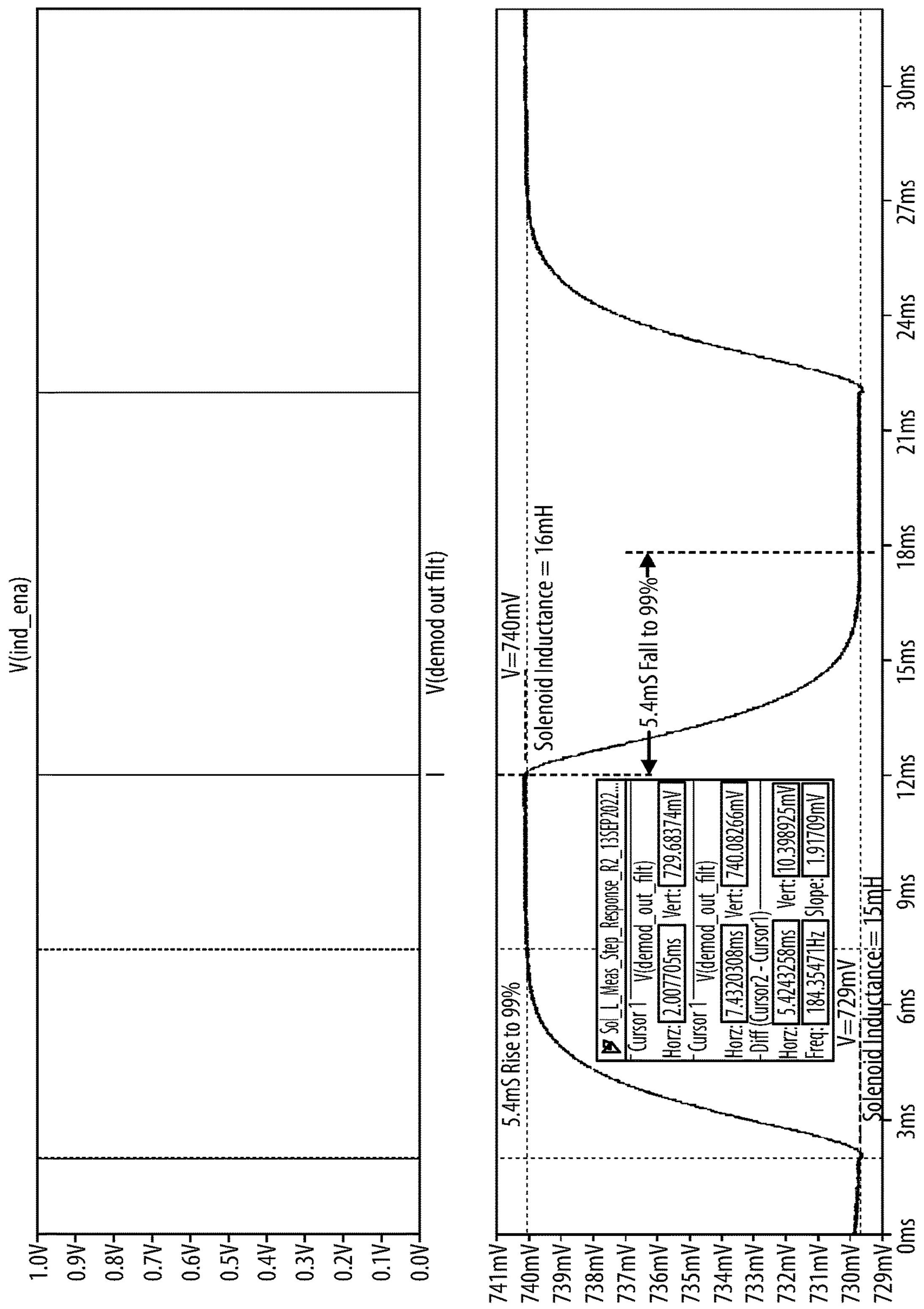
FIG. 4F shows plotted results of the simulation circuit of FIG. 4A at varying solenoid inductance, showing a rate at which output stabilizes to a new value with changing solenoid inductance.

In FIG. 4F, since the solenoid inductance can be used to estimate the solenoid mechanical position in a control scheme, rise/fall times (time delay) can be evaluated. As shown, embodiments allow for response times that can be compatible with control system bandwidth requirements. In certain embodiments, response time can be improved by trading AC excitation frequency and demodulator filter characteristics against allowable peak to peak ripple at the filtered demodulator output. FIGS. 5A-5E show another simulation circuit and associated charts with results to demonstrate signal inputs and outputs of the system under various conditions.

Embodiments can include a system that can estimate a linear solenoid plunger position or a rotary solenoid shaft angle by continuously measuring the imaginary voltage of the inductive portion of the solenoid. Coil inductance varies with the position of the movable part of the solenoid; plunger for a linear solenoid, shaft angle for certain rotary solenoids. Solenoid current can work against the return spring such that {Solenoid Current×Torque or Force Constant=Solenoid Spring Constant×Position}. The embodiments shown are used to demonstrate the concept of extracting the imaginary portion of the solenoid voltage to determine the coil inductance, and by extension determine the solenoid position.

Embodiments shown demonstrate using analog hardware or equivalent digital/software components to superimpose an AC excitation current on top of the DC current needed to energize the solenoid, extract the imaginary part of the solenoid voltage by quadrature-demodulation, and low-pass filter the quadrature-demodulator output voltage to get an average DC value that is proportional to solenoid inductance. The filtered quadrature-demodulator output voltage represents an estimate of the solenoid mechanical position. While an analog implementation is depicted, the quadrature demodulation/filtering and/or any other suitable function can also be accomplished in the digital domain using Analog to Digital Converter (ADC), and a software algorithm, for example. Embodiments can provide solenoid position feedback for controlling the velocity and/or position of a solenoid actuator in a fuel-control valve.

Embodiments can provide a method to determine the position of a solenoid by using its own inductance; no separate sensor is needed to determine the solenoid position. Embodiments can inject a small AC sinusoidal signal on the solenoid DC drive current. Embodiments can perform a quadrature demodulation of the solenoid voltage. The average DC output voltage of the quadrature demodulator is proportional to solenoid inductance. Solenoid position is proportional to solenoid position.

Embodiments can provide the benefit of not needing an independent sensor to determine the position of the solenoid. The position information can be extracted for the inductance of the solenoid. Embodiments can thus provide a sensorless solenoid position determination system configured to determine a position of a solenoid without a sensor.

Embodiments can include any suitable computer hardware and/or software module(s) to perform any suitable function (e.g., as disclosed herein).

As will be appreciated by those skilled in the art, aspects of the present disclosure may be embodied as a system, method or computer program product. Accordingly, aspects of this disclosure may take the form of an entirely hardware embodiment, an entirely software embodiment (including firmware, resident software, micro-code, etc.), or an embodiment combining software and hardware aspects, all possibilities of which can be referred to herein as a "circuit," "module," or "system." A "circuit," "module," or "system" can include one or more portions of one or more separate physical hardware and/or software components that can together perform the disclosed function of the "circuit," "module," or "system", or a "circuit," "module," or "system" can be a single self-contained unit (e.g., of hardware and/or software). Furthermore, aspects of this disclosure may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of this disclosure may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of this disclosure may be described above with reference to flowchart illustrations and/or block diagrams of methods, apparatus (systems) and computer program products according to embodiments of this disclosure. It will be understood that each block of any flowchart illustrations and/or block diagrams, and combinations of blocks in any flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in any flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified herein.

Those having ordinary skill in the art understand that any numerical values disclosed herein can be exact values or can be values within a range. Further, any terms of approximation (e.g., "about", "approximately", "around") used in this disclosure can mean the stated value within a range. For example, in certain embodiments, the range can be within (plus or minus) 20%, or within 10%, or within 5%, or within 2%, or within any other suitable percentage or number as appreciated by those having ordinary skill in the art (e.g., for known tolerance limits or error ranges).

The articles "a", "an", and "the" as used herein and in the appended claims are used herein to refer to one or to more than one (i.e., to at least one) of the grammatical object of the article unless the context clearly indicates otherwise. By way of example, "an element" means one element or more than one element.

The phrase "and/or," as used herein in the specification and in the claims, should be understood to mean "either or both" of the elements so conjoined, i.e., elements that are conjunctively present in some cases and disjunctively present in other cases. Multiple elements listed with "and/or" should be construed in the same fashion, i.e., "one or more" of the elements so conjoined. Other elements may optionally be present other than the elements specifically identified by the "and/or" clause, whether related or unrelated to those elements specifically identified. Thus, as a non-limiting example, a reference to "A and/or B", when used in conjunction with open-ended language such as "comprising" can refer, in one embodiment, to A only (optionally including elements other than B); in another embodiment, to B only (optionally including elements other than A); in yet another embodiment, to both A and B (optionally including other elements); etc.

As used herein in the specification and in the claims, "or" should be understood to have the same meaning as "and/or" as defined above. For example, when separating items in a list, "or" or "and/or" shall be interpreted as being inclusive, i.e., the inclusion of at least one, but also including more than one, of a number or list of elements, and, optionally, additional unlisted items. Only terms clearly indicated to the contrary, such as "only one of" or "exactly one of," or, when used in the claims, "consisting of," will refer to the inclusion of exactly one element of a number or list of elements. In general, the term "or" as used herein shall only be interpreted as indicating exclusive alternatives (i.e., "one or the other but not both") when preceded by terms of exclusivity, such as "either," "one of," "only one of," or "exactly one of."

Any suitable combination(s) of any disclosed embodiments and/or any suitable portion(s) thereof are contemplated herein as appreciated by those having ordinary skill in the art in view of this disclosure.

The embodiments of the present disclosure, as described above and shown in the drawings, provide for improvement in the art to which they pertain. While the subject disclosure includes reference to certain embodiments, those skilled in the art will readily appreciate that changes and/or modifications may be made thereto without departing from the spirit and scope of the subject disclosure.

What is claimed is:

1. A system, comprising:

an inductance module configured to operatively connect to a solenoid, wherein the inductance module is configured to:
- input an AC excitation signal to the solenoid;
- determine and/or compare a current-voltage (CV) phase shift between a solenoid current and solenoid voltage; and
- output an output signal indicative of solenoid inductance based on the CV phase shift, wherein the inductance module includes:
- an AC excitation module configured to connect to the solenoid to output the AC excitation signal to the solenoid;
- a reference module connected to the AC excitation module and configured to read a voltage drop across a reference resistor, wherein the reference resistor is disposed in series between the AC excitation module and the solenoid, wherein the reference module is configured to output a reference signal indicative of voltage across the reference resistor and/or current through the reference resistor;
- a 90-degree phase shift module connected to the reference module to receive the reference signal and to output a phase shift signal being the reference signal phase shifted 90 degrees; and
- a zero-cross comparator connected to the 90-degree phase shift module and configured to receive the phase shift signal and output a clock signal.

2. The system of claim 1, wherein the inductance module is configured to output a DC signal correlated to the CV phase shift which correlates to solenoid inductance.

3. The system of claim 2, further comprising a solenoid position module operatively connected to the inductance module, the position module configured to receive the output signal and output a solenoid position signal as a function of the output signal such that a solenoid position is correlated to solenoid inductance, which is correlated to the CV phase shift.

4. The system of claim 1, wherein the clock signal is a square wave signal, wherein the clock signal is 90 degrees phase shifted from the solenoid current.

5. The system of claim 4, wherein the inductance module includes a DC removal module configured to connect to the solenoid to receive solenoid voltage and/or solenoid current, and to remove a DC component thereof to output an AC component.

6. The system of claim 5, wherein the inductance module includes a synchronous demodulator module operatively connected to the DC removal module to receive the AC component, wherein the synchronous demodulator module is operatively connected to the zero-cross comparator module to receive the clock signal at a quadrature clock thereof to output a quadrature clock signal, to detect the imaginary portion of the AC signal, and to output a demodulator signal having a modified wave shape with an average amplitude indicative of inductance of the solenoid.

7. The system of claim 6, wherein the inductance module includes a low pass filter operatively connected to the synchronous demodulator module to receive the demodulator signal, and to output a filter DC signal that is the average value of the demodulator output.

8. The system of claim 7, wherein the filter DC signal is the output signal indicative of solenoid inductance.

9. The system of claim 7, wherein the clock signal is keyed to and phase shifted 90 degrees from solenoid current, and wherein the AC component input to the synchronous demodulator module is AC solenoid voltage such that the demodulator provides a comparison of phase shifted solenoid current to solenoid voltage.

10. The system of claim 1, further comprising the solenoid.

11. The system of claim 10, further comprising a feedback system connected to and/or including the inductance module and configured to control a position of the solenoid based on the output signal.

12. The system of claim 1, wherein the inductance module comprises analog hardware, software, and/or any suitable combination thereof.

13. A method, comprising:

connecting, via an AC excitation module, to the solenoid;

injecting, via the AC excitation module, an AC excitation signal into a solenoid;

creating, via a reference module connected to the AC excitation module, a reference signal indicative of solenoid current;

phase shifting, via a 90-degree phase shift module connected to the reference module, the reference signal 90 degrees; and converting, via a zero-cross comparator connected to the 90-degree phase shift module, the phase shifted reference signal to a clock signal;

comparing, via an inductance module, a phase shifted AC solenoid current or AC solenoid voltage to non-phase shifted AC solenoid voltage or AC solenoid current, respectively, to output a signal indicative of solenoid inductance.

14. The method of claim 5, further comprising determining solenoid position as a function of solenoid inductance.

* * * * *